US006005360A

United States Patent [19]

Pace

[11] Patent Number: 6,005,360

[45] **Date of Patent: *Dec. 21, 1999**

[54] POWER UNIT FOR THE SUPPLY OF HYDRAULIC ACTUATORS

[75] Inventor: Adolfo Pace, Arzignano, Italy

[73] Assignee: SME Elettronica SPA, Arzigano, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,682

[22] Filed: Sep. 24, 1997

[51] Int. Cl.[6] ............................ H02P 3/14; F16D 31/02

[52] U.S. Cl. ............................ 318/376; 91/361; 91/390; 60/414; 60/476

[58] Field of Search ............................ 318/376–378, 318/140; 60/477, 413–418, 476, 368, 389, 390; 91/358 R, 359, 361, 390

[56] References Cited

U.S. PATENT DOCUMENTS

| | | | |
|---|---|---|---|
| 4,702,076 | 10/1987 | Rosman . | |
| 4,707,988 | 11/1987 | Palmers | 60/413 |
| 5,329,441 | 7/1994 | Aoki et al. | 364/148 |
| 5,499,694 | 3/1996 | Dorn | 187/200 |
| 5,505,043 | 4/1996 | Baginski et al. | 60/477 |
| 5,649,422 | 7/1997 | Baginski et al. | 60/431 |

FOREIGN PATENT DOCUMENTS

| | | |
|---|---|---|
| 40 34 666 A1 | 10/1991 | Germany . |
| 44 02 653 a1 | 8/1995 | Germany . |
| 2 243 927 | 11/1997 | United Kingdom . |

*Primary Examiner*—Brian Sircus
*Attorney, Agent, or Firm*—Watson Cole Grindle Watson P.L.L.C.

[57] ABSTRACT

The invention discloses a power unit (1) which comprises: an accumulator battery (2); an electric converter (3) supplied by said accumulator battery (2); an electric motor (30) supplied by said converter (3); a hydraulic pump (4) mechanically connected to said electric motor (30), suited to put under pressure a liquid (50) which supplies one or more actuators (9) in order to lift a load (11) connected to them. Said pump (4) is of the reversible type and operates as a hydraulic motor suited to drive into rotation said electric motor (30) which operates as a generator supplying said battery (2) by means of said converter (3) whenever the descent by gravity of the load (11) supported by said one or more actuators (9) puts under pressure the oil held therein which passes through said pump (4) entering from the delivery opening (42) and coming out of the inlet opening (41).

5 Claims, 4 Drawing Sheets

POWER UNIT FOR THE SUPPLY OF HYDRAULIC ACTUATORS

The invention concerns a power unit for supplying hydraulic actuators with liquid under pressure, particularly suited to be used on self-propelled operating machines, such as fork-lifts and trolleys in general.

According to one of the known embodiments, the power units which supply the hydraulic actuators of self-propelled operating machines, particularly of fork-lift trucks, comprise an accumulator battery which, by means of a converter, supplies an electric motor connected to a hydraulic pump which puts under pressure a liquid, preferably hydraulic oil. The hydraulic oil under pressure is sent, by means of one or more distributors, to the circuit which supplies the actuator or the actuators lifting and lowering the forks. Each of said distributors, when set in one position conveys the oil from the pump to the actuators in order to obtain the lifting of the forks, while when set in another position it conveys the oil of the actuators to a collecting tank, so as to permit the lowering of the forks themselves. The suction pipe of the pump is also connected with the same oil collecting tank.

The power units belonging to the described known type, present a number of inconveniences.

A first inconvenience is that, in order to change the speed of the descent movement of the forks and, therefore, of the load placed on them, it is necessary to use proper flow regulators.

These are inserted in the discharge pipe which lead the oil back into the tank and are adjusted by the operator by means of control levers in order to adjust the speed of the descent. It is easy to understand that this fact causes a considerable loss of energy, corresponding to the potential energy corresponding to the difference in height between the starting position and the arrival position of the load, which is dissipated in the heat generated by the oil when passing through the flow regulator.

A second inconvenience is that the pump with which the power units belonging to the known type are equipped, is a pump having a constant capacity and in order to change the ascending speed of the forks and, therefore, of the load placed on the forks, a part of the quantity of oil which the pump sends to the actuator is conveyed through a discharge by-pass. It is easy to understand that this fact causes a waste of energy, sometimes a considerable one, since the hydraulic oil which is sent through the discharge by-pass, is oil taken at the delivery of the pump after it has been compressed to high pressure, which requires the expenditure of some energy.

Another inconvenience for the power units belonging to the known type is the difficulty in obtaining a fine adjustment of the ascending speed and the descending speed of the load. The adjustment of the hydraulic valves, in fact, is made by operating a mechanical lever which permits a rather limited accuracy of movement.

A further inconvenience is also that the non-reversible pumps which are used in the power units belonging to the known type, are mostly gear pumps which present rather low performances and realize rather limited working pressures.

The present invention proposes to overcome all the mentioned inconveniences and limitations.

More specifically, one of the purposes of the invention is to realize a power unit for supplying one or more actuators with liquid under pressure, particularly suited to be mounted on fork-lift trucks, which, except for unavoidable losses, permits to recover the potential energy owned by the load when it is lifted.

It is another purpose to realize a power unit wherein the change of capacity to the actuators is done by changing the pump capacity and not by sending a part of the oil capacity taken at the delivery of the pump through a discharge by-pass.

It is a further purpose for the adjustment of the ascending and descending speeds of the load to be adjusted very accurately. It is another purpose for the power unit according to the invention to realize higher working pressures as compared with the power units belonging to the known technique, so as to permit the reduction of the volumes of oil in circulation, as well as to reduce the dimensions of the elements forming the system.

Not the least purpose is to obtain, by means of said power unit, the electronic control of the mechanical end strokes, so as to give the maximum torque without the intervention of by-pass circuits which are installed only for safety purposes.

The mentioned purposes are achieved by a power unit for supplying one or more actuators with liquid under pressure which, in accordance with the main claim, comprises:

- an accumulator battery;
- an electric converter supplied by said accumulator battery;
- an electric motor supplied by said converter;
- a hydraulic pump mechanically connected to said electric motor by which it is driven into rotation, said pump presenting at least one suction opening hydraulically connected to a tank holding said liquid to be put under pressure and at least one delivery opening hydraulically connected to said one or more actuators suitable for lifting a load connected to them, and is characterized in that said pump is of the reversible type and suited to operate as a hydraulic motor which drives into rotation said electric motor which operates as a generator supplying said battery by means of said converter, whenever the liquid present in said one or more actuators is put under pressure because of the descent by gravity of the load supported by said one or more actuators and passes through said pump entering from the delivery opening and coming out of the inlet opening to flow into said collecting tank.

According to one preferred embodiment said electric converter is a vectorial inverter with torque control suited to induce in said electric motor, consisting of an asynchronous motor, any torque value up the maximum torque suppliable, even when the shaft of said asynchronous motor is idle and said load is in a lifted position in relation to the ground.

Advantageously, the use for the power unit according to the invention of a positive-displacement reversible pump, permits a significant energy saving since during the lifting phase of the load the amount of oil put under pressure is directly proportional to the required lifting speed, while during the descending phase of the load said positive-displacement pump, operating by means of a motor, permits the recovery of the potential energy of the load. Such recoveries permit a better autonomy of operation of the battery as compared with equivalent systems belonging to the known type.

With as much advantage, the use of said positive-displacement reversible pump permits to obtain higher working pressures which imply reductions in the volumes of oil in circulation, reductions in the dimensions of the elements forming the circuit and much higher efficiencies as compared with equivalent systems belonging to the known technique.

Again to an advantage, the use of the control torque vectorial in combination with the asynchronous motor and the reversible pump, permits to adjust the duty speed as far as zero speed, while keeping on supplying the required torque until it reaches the maximum value.

Apart from this, advantageously, the system presents a better handling, since all the speed adjustments can be done by acting directly on the inverter, for instance by operating a manipulator of the joy-stick type. Therefore, the power unit according to the invention, as compared with similar power units belonging to the known technique, presents, not only a better handling, but also the possibility of acting on the load with much more delicate and controlled manoeuvres.

Further scope of applicability of the present invention will become apparent from the detailed description given hereinafter.

However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein.

Figure 1:
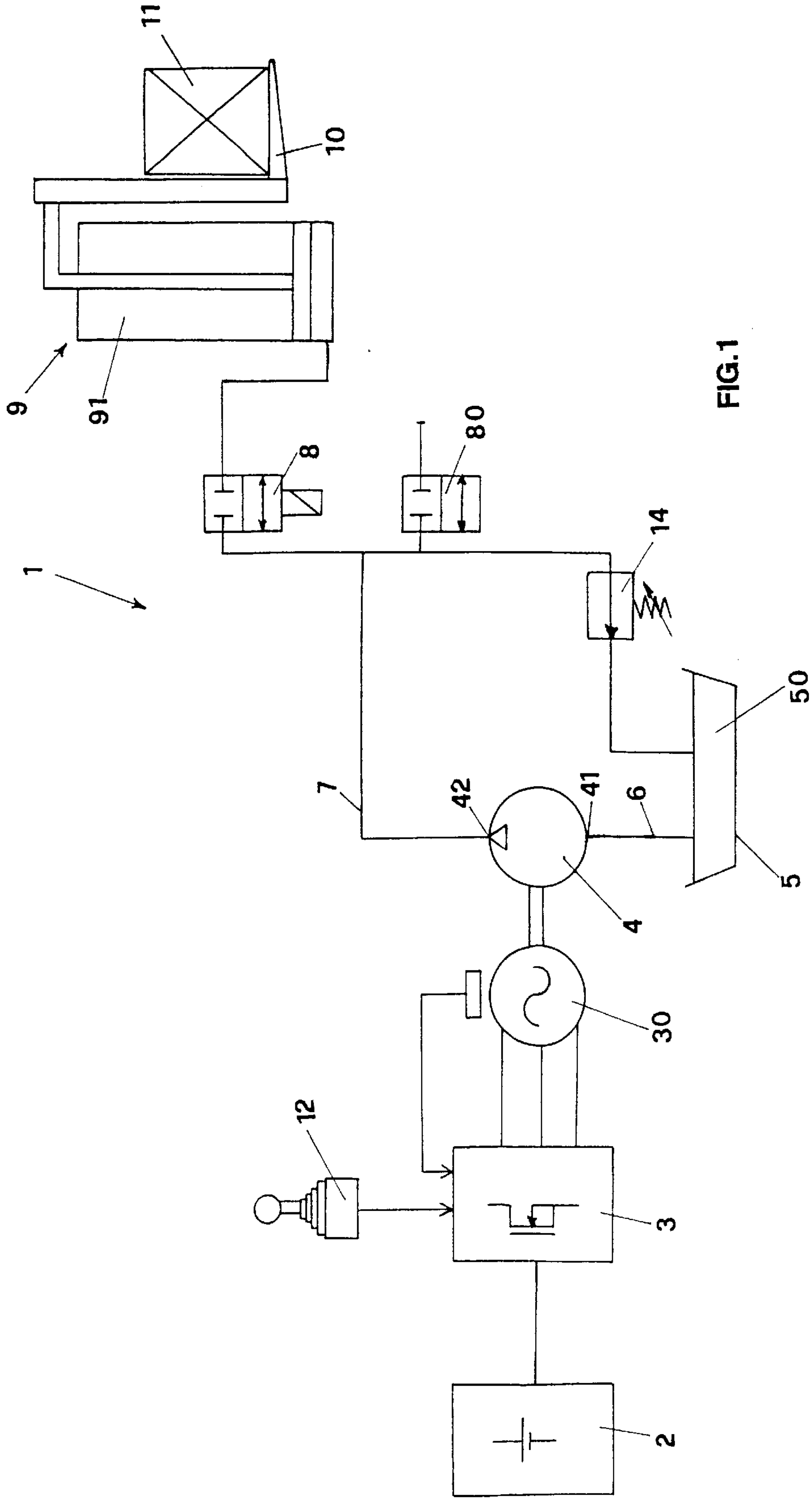
FIG. 1 shows the schematic representation of the power unit according to the invention in its resting conditions, said power unit being applied to a lift truck wherein it is used to lift and lower the forks supporting the load.

As can be observed in FIG. 1, the power unit according to the invention, indicated as a whole with 1, comprises:

- an accumulator battery 2;
- an inverter 3 supplied by said battery 2;
- an asynchronous motor 30 supplied by said inverter 3;
- a reversible pump 4 mechanically connected to said asynchronous motor 30 by means of which it is driven into rotation;
- a tank 5 wherein the suction pipe 6 connected to the suction opening 41 of said pump 4 is immersed;
- a delivery pipe 7 which connects the delivery opening 42 of the pump 4 to a distributor 8 supplying an actuator which, in this case, consists of the hydraulic cylinder 9 lifting the forks 10 of any lift truck, not represented in the Figure, on which the load 11 to be lifted is placed.

Another actuator 80 is arranged in connection with the delivery pipe 7 to indicate that more actuators can be supplied by the same delivery 7.

More in particular, it can also be observed that said inverter is connected to a joy-stick type manipulator 12 which permits the adjustment of the asynchronous motor 30 and to an encoder 13 which controls the number of revolutions of the asynchronous motor 30.

The system also comprises a valve of maximum pressure 14 which, in case of emergency, discharges in the collecting tank 5 the oil under pressure drawn from the delivery pipe 7.

The inverter 3 which is used, is a vectorial inverter with torque control belonging to the known type, suited to induce in said asynchronous motor 30 any torque value until the maximum suppliable torque is reached, even when the shaft of said asynchronous motor 30 is idle.

With regard to said pump 4, it is a reversible pump preferably of the piston type which, thanks to its reversibility, can also operate as a motor, as will be seen in the description given hereinafter, when it is supplied with liquid under pressure which enters through its delivery opening 42 and comes out of the suction opening 41. In that case said pump drives into rotation the asynchronous motor 30 which operates as a generator and through the inverter 3 it supplies power to battery 2, re-charging it.

In order to describe the operation of the power unit according to the invention, reference is made to FIG. 1 wherein it can be observed that in the resting position the distributor 8 is shut and load 11, supported by the forks 10, is immobile in the position represented which corresponds, for instance, to the position on the ground.

Figure 2:
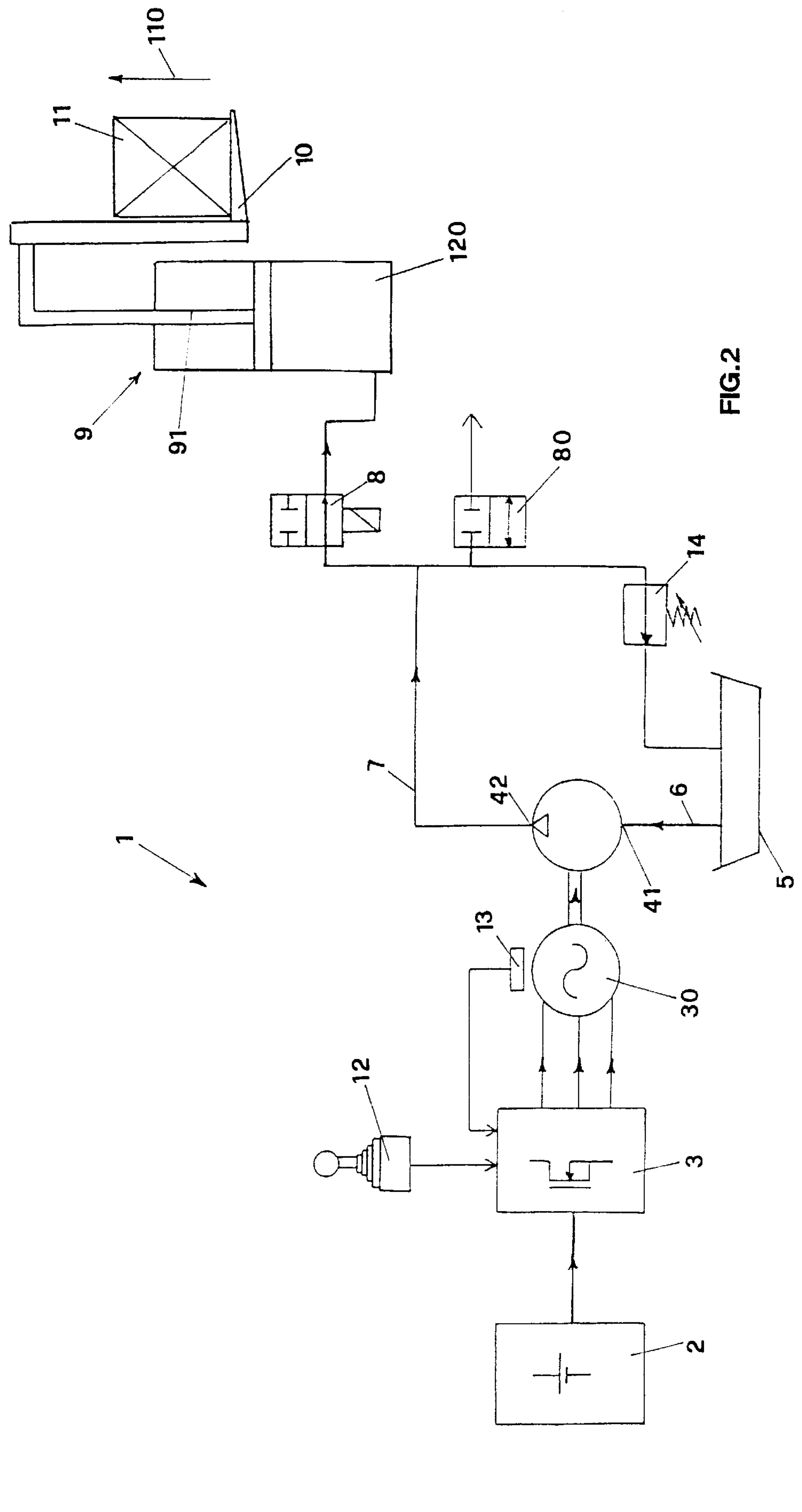
FIGS. 2, 3 and 4 show the power unit of FIG. 1 during different operating phases.

By acting on the joy-stick 12, the asynchronous motor 30 is driven into rotation and pump 4 sucks the oil 50 from tank 5 and through the delivery pipe 7 it sends it to each distributor 8. Should distributor 8, which supplies the actuator 9, be set in the open position, as can be observed in FIG. 2, actuator 9 is supplied and stem 91 with which it is equipped, comes out causing the lifting of the forks 10 and of load 11 placed on them, following direction 110.

It is pointed out that the distributor 8 could also not be present and the delivery pipe 7 could supply the actuator 9 directly. It is preferable, however, for the actuator 8 to be present, since by means of its opening, it is possible to choose the actuator to be supplied by acting on the joy-stick 12.

It is possible to change the lifting speed of load 11 by acting appropriately on the joy-stick 12 by means of which the speeds of the asynchronous motor 30 and of the pump 4 connected to it and, therefore, the quantity of oil under pressure which supplies the actuator 9, are varied.

Figure 3:
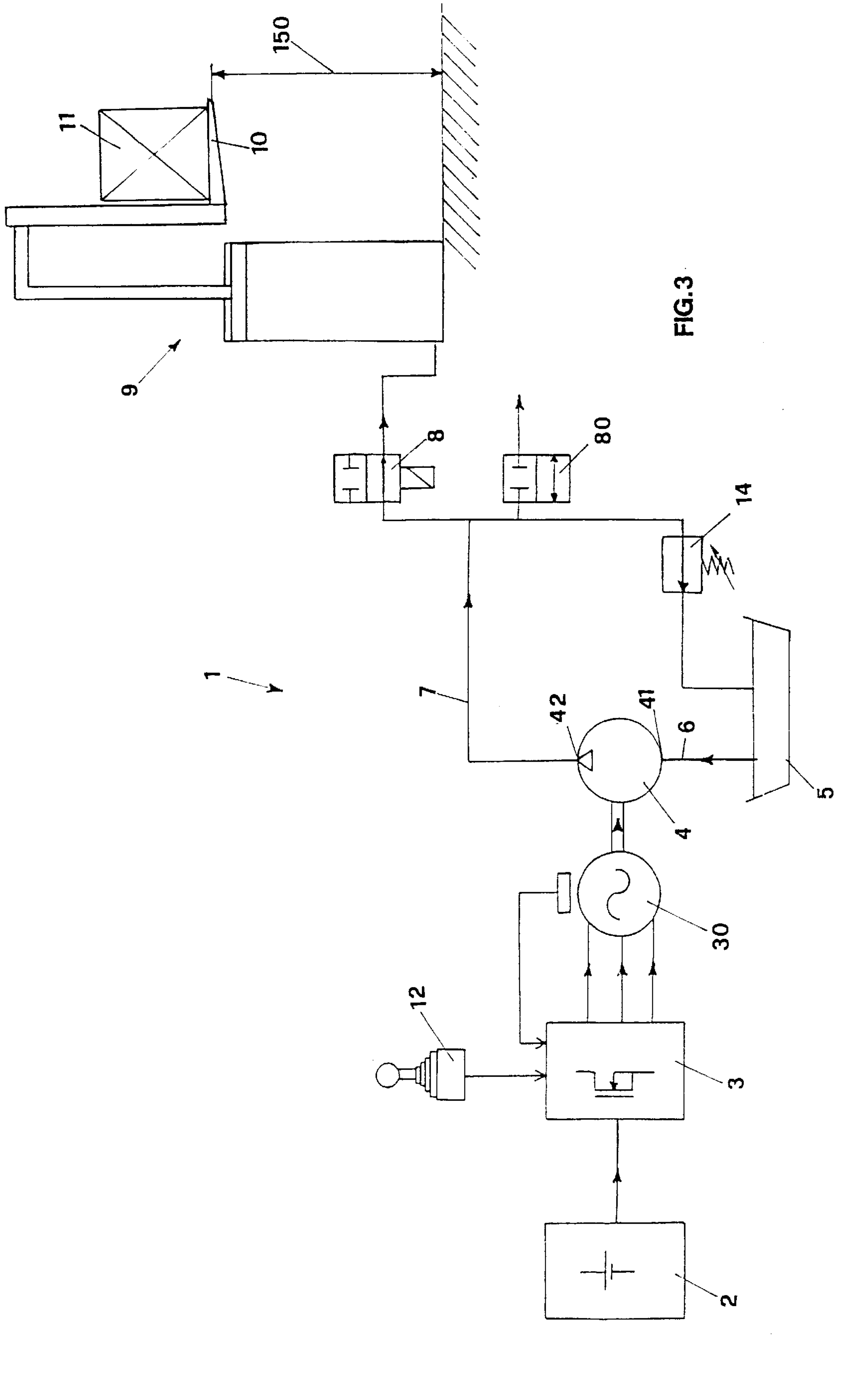

When load 11 has reached the desired lifting position represented in FIG. 3, it remains blocked in the attained position, since the asynchronous motor 30, even though it does not rotate, gives to the shaft and, therefore, to the reversible pump 4 keyed to it, the suitable torque necessary to bring the oil held in the actuator 9 to the pressure suited to support the load, said pressure being, at any rate, lower than the operating pressure of the valve of maximum pressure 14. In such conditions, the oil circulation stops and, as a consequence, load 11 remains blocked in the attained position.

It is interesting to observe, first of all, that any change of the lifting speed of load 11 is obtained by changing the number of revolutions of the asynchronous motor 30 and, consequently, of pump 4 connected with it. In this way, it is possible to vary the quantity in the delivery pipe 7, which results to be proportional to the speed at which the forks 10 and load 11 placed on them are intended to be lifted. Therefore, all the energy that the asynchronous motor 30 supplies is used, except for the losses, to lift the load, contrary to what happens, instead, in the power units belonging to the known technique in which the electric motor and the pump supply a fixed quantity and the speed change for lifting the load is obtained by sending a part of the quantity taken at the delivery through a discharge by-pass, thereby suffering more or less important losses of energy.

Figure 4:
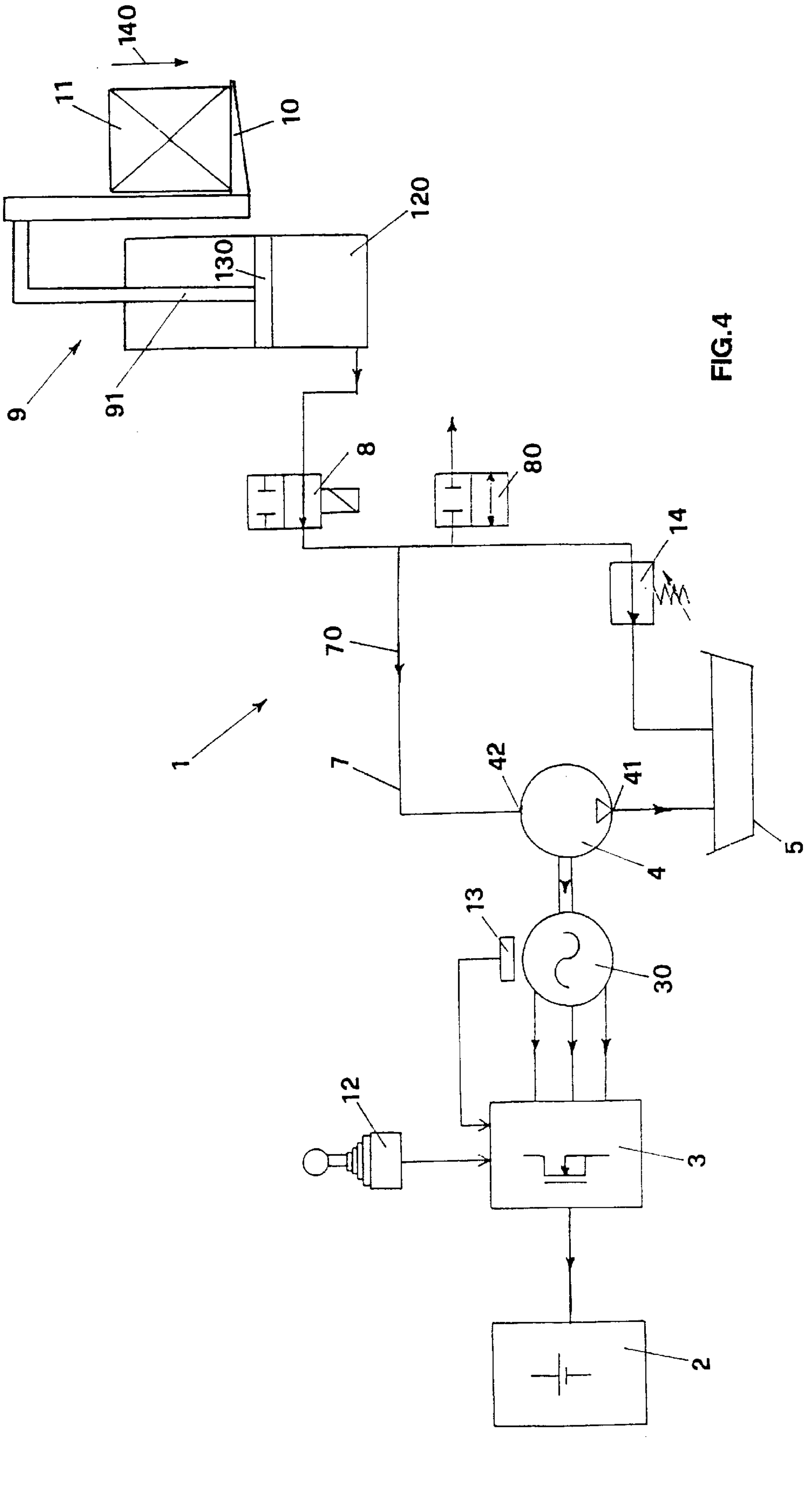

In order to lower the load, it is necessary to act on inverter 3 by means of the joy-stick 12, by adjusting the resistant torque which the asynchronous motor 30 exerts on pump 4. The latter, because it is of the reversible piston type, reverses its rotational direction, since it is supplied in correspondence with the delivery opening 42 by the flow 70 of oil which, as can be observed in FIG. 4, comes from the positive chamber 120 of the actuator 9, being pushed by piston 130 which is displaced downward following direction 140 because of the descent by gravity of load 11 placed on the forks 10. Through the suction opening 41 of the pump, the oil is then discharged into tank 5.

During the descent of load 11, pump 4 acts then as a hydraulic motor and drives into rotation the asynchronous motor 30 which acts, therefore, as an electric power generator. By means of the inverter 3, it supplies battery 2, re-charging it, thus recovering, except for the inevitable losses, the potential energy owned by load 11 because of its being at height 150 from the ground.

Any change of the descending speed of the load is adjusted by means of the joy-stick 12.

Should the forks 10 be free of any load or the load 11 they support be very small, their descent could be slow or they might even stop at a certain height because of the frictions. In that case, through the joy-stick 12, it is possible to act on pump 4 and make it work in suction on the delivery pipe 7 side, so as to accelerate the descent of the forks.

It is also important to observe that when the forks 10 reach the upper end stroke, having set the valve of maximum pressure 14 to a higher operating pressure than that yielded by the asynchronous motor 30 at its maximum torque by means of the positive-displacement pump 4, the motor itself stops: the mechanical power supplied is reduced to zero and the electrical power absorbed is reduced only to the losses in the motor. In the systems belonging to the known technique, instead, when the forks reach the upper end stroke, the motor keeps on running and the pump produces a flow of oil which is discharged by the intervention of the valve of maximum pressure, with consequent very high losses of energy.

Therefore, it is easy to understand, that the power unit according to the invention also achieves the purpose of recovering as electric energy which is stored in the battery 2, the potential energy which load 11 loses when it descends, contrary to what happens in the power units belonging to the known technique in which all the potential energy owned by the load is dissipated in heat by the flow regulators which are used to adjust the descending speed of the load.

On the basis of what has been described, it is easy to understand that the power unit according to the invention achieves all the proposed purposes.

In particular, the purpose of reducing the losses of energy while the load is being lifted, is achieved. In fact, contrary to what happens in the units belonging to the known technique in which the lifting speed of the load is changed by sending through a discharge by-pass a part of the fixed quantity of oil which the pump sends at the delivery, in the power unit according to the invention, instead, the capacity of the pump at the delivery is changed according to the speed with which the load is intended to be lifted. This result is achieved by using a reversible pump, preferably of the piston type.

Moreover, the purpose of recovering, except for unavoidable losses, the potential energy owned by the load when is in the lifted position, is also achieved. In fact, by using the pressure which the load during its descent generates on the oil flowing back into the tank, it is possible to make the pump to work as a hydraulic motor in order to drive into rotation the asynchronous motor. The latter, by acting as a generator, re-charges the battery by means of the inverter.

These recoveries of energy turn into a better autonomy of operation of the battery.

It has also been seen that by using a reversible pump, preferably of the piston type, to pump the oil rather than a non-reversible pump which is usually used in the power units belonging to the known technique, there is the advantage of operating with higher pressures and, consequently, of reducing the volumes of hydraulic liquid which circulates in the system. This fact also permits to reduce the dimensions of the elements composing the system and to increase its efficiencies.

With as much advantage, since all the changes in the ascending and descending speeds of the load are done by electrically intervening on the inverter by means of a joy-stick type manipulator, said changes are done very softly, thus obtaining fine adjustments of the ascending and descending speeds of the load.

Moreover, it has also been seen how the advantage of obtaining an electronic control of the mechanical end strokes, is achieved.

It is clear that the power unit, object of the present invention, can be also used on other types of operating machines, therefore, not only on fork-lift trucks.

During the manufacturing phase, the power unit according to the invention may undergo changes suited to improve its operation or to make its manufacture less costly.

All said changes must all fall within the spirit and scope of the present invention.

I claim:

1. A power unit for supplying liquid under pressure from a storage tank to at least one actuator operative between respective lifting and idle operations for lifting and maintaining a load comprising:

an accumulator battery;

a vectorial inverter supplied by said accumulator battery;

an electric motor supplied by said inverter including a torque control for controlling the motor with torque signals corresponding to the lifting and idle operations respectively;

a reversible hydraulic pump operative in first and second directions and at idle, mechanically connected to said electric motor, said pump having at least one suction opening hydraulically connected to the tank and at least one normally open delivery opening hydraulically connected to said at least one actuator for lifting the load when the pump is operated by the motor in the first direction to pressurize the liquid in response to the lifting torque signal, and said pump being operative in the second direction by pressurization of the liquid into the pump at the delivery opening, said pump being operative as a hydraulic motor for driving the electric motor to operate as a generator supplying said battery via the converter when the load is allowed to descend and said pump being operative to maintain the load when the motor is operated by the idle torque signal maintaining the shaft at idle against the lifted load via the normally open delivery opening.

2. A power unit according to claim 1 including a maneuvering device coupled to the inverter for selectively controlling revolutions of the motor.

3. A power unit according to claim 2 wherein the maneuvering device comprises a joy stick.

4. A power unit according to claim 2 comprising a channel for each actuator and wherein said delivery opening of the pump is hydraulically connected to each of said actuators and further including a distributor for each channel interposed between the delivery opening and each distributor for selectively enabling each actuator when a channel is selectively opened.

5. A power unit according to claim 1 wherein said reversible pump comprises a piston pump.

* * * * *